United States Patent
Bean et al.

(10) Patent No.: US 7,275,106 B1
(45) Date of Patent: *Sep. 25, 2007

(54) SUSTAINING TCP CONNECTIONS

(75) Inventors: Thomas Alan Bean, West Columbia, SC (US); Emily Hipp, Oakland, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 903 days.

This patent is subject to a terminal disclaimer.

(21) Appl. No.: 10/458,819

(22) Filed: Jun. 10, 2003

Related U.S. Application Data

(60) Provisional application No. 60/386,995, filed on Jun. 10, 2002, provisional application No. 60/386,994, filed on Jun. 10, 2002.

(51) Int. Cl.
  G06F 15/16 (2006.01)
  H04Q 7/20 (2006.01)
(52) U.S. Cl. .................................. 709/227; 455/422.1
(58) Field of Classification Search ................ 709/227, 709/218, 228; 455/422.1
See application file for complete search history.

(56) References Cited

U.S. PATENT DOCUMENTS

| | | | |
|---|---|---|---|
| 6,212,175 B1 | 4/2001 | Harsch | |
| 6,430,622 B1 * | 8/2002 | Aiken, Jr. et al. | 709/245 |
| 6,603,744 B2 * | 8/2003 | Mizutani et al. | 370/310 |
| 6,920,501 B2 * | 7/2005 | Chu et al. | 709/228 |
| 6,934,755 B1 * | 8/2005 | Saulpaugh et al. | 709/226 |
| 7,080,159 B2 * | 7/2006 | Chu et al. | 709/246 |
| 7,143,443 B2 | 11/2006 | Song et al. | |
| 2002/0166117 A1 * | 11/2002 | Abrams et al. | 717/177 |
| 2003/0187915 A1 * | 10/2003 | Sun et al. | 709/201 |
| 2003/0204593 A1 | 10/2003 | Brown et al. | |

OTHER PUBLICATIONS

Office Action from U.S. Appl. No. 10/459,213, mailed Dec. 18, 2006.

* cited by examiner

*Primary Examiner*—William Vaughn
*Assistant Examiner*—Peling A Shaw
(74) *Attorney, Agent, or Firm*—Lawrence J. Merkel; Meyertons, Hood, Kivlin, Kowert & Goetzel, P.C.

(57) ABSTRACT

A method is provided for maintaining a connection between a local application and a remote application while the local application is unavailable or inactive. The method includes pausing the local application and sending data over the connection to maintain the connection. A connection filter on the same computing node as the local application sends data to maintain the connection by responding to acknowledgements and heartbeats from the remote application. The connection filter is configured to initiate the restoration of the local application in response to data that it is not configured to handle.

29 Claims, 10 Drawing Sheets

Internet Protocol Header Format from rfc 791

Note that each tick mark represents one bit position.

IPv6 Header Format from rfc 1883

Note that each tick mark represents one bit position.

TCP Header Format from rfc 793

Note that each tick mark represents one bit position.

SUSTAINING TCP CONNECTIONS

CROSS-REFERENCE TO RELATED APPLICATIONS

This application claims the benefit of U.S. Provisional Application Ser. No. 60/386,995 titled "Sustaining TCP Connections to Remote Applications While a Local Application is Terminated and Restarted," filed Jun. 10, 2002, which is incorporated herein by reference. This application also claims benefit of U.S. Provisional Application Ser. No. 60/386,994 titled "TCP Connection Migration Between UNIX Systems," filed Jun. 10, 2002, which is incorporated herein by reference. This application is related to, and has the same filing date as, co-owned U.S. application Ser. No. 10/459,213 titled "TCP Connection Migation."

BACKGROUND OF THE INVENTION

1. Field of the Invention

The present invention relates generally to the field of computer networks and more particularly to a method and an apparatus for sustaining a network connection between local and remote applications.

2. Description of the Prior Art

Presently, users purchase dedicated software applications to provide computing resources. However, certain economies of scale should be achievable by making applications available over a network, such as the Internet, so that users need not own their own dedicated copies. Instead, an application could be made centrally available and users would purchase the computing services made available by the application.

One problem with centralizing computer services is what to do with software applications that are running on the centralized system but are not actively being used. Presently, if a user of a dedicated computer system opens an application, for example, a spreadsheet program, and then leaves the computer to take a break, the application on the dedicated computer system simply idles until the user returns. Since the computer system is dedicated to the user, there is little or no loss of system efficiency caused by the running but idle application. However, a centralized computing system built to accommodate multiple idle applications would necessarily include considerably more hardware capacity than would be needed to handle just active applications.

Accordingly, what is desired is a method for handling network connections to applications in a manner that more efficiently utilizes the centralized computing system resources.

SUMMARY

The present invention provides a method for maintaining a connection between a remote application and a local application. The method includes establishing the connection, such as a TCP connection, between the remote and local applications, pausing the local application, and sending data over the connection to maintain the connection. In some embodiments, establishing the connection can include assigning a virtual IP address to the local application, and in some of these embodiments establishing the connection can include monitoring communications having the virtual IP address. In some embodiments, pausing the local application can include determining an activity level for the connection. Pausing the local application can also include capturing a snapshot of the local application, and in some of these embodiments capturing the snapshot includes freezing a state of the local application, and can also include storing the state to a memory device.

According to the method of the invention, sending data over the connection can include transmitting buffered data from the local application to the remote application. Sending data over the connection can also include responding to TCP ACK packets and handling heartbeat packets.

The method of the invention may further include restoring the local application, and in some of these embodiments pausing the local application can include storing a state of the local application to a memory device and restoring the local application can include recalling the state from the memory device. The method of the invention may also further include establishing a connection filter along the connection between the local and remote applications, and in some of these embodiments the connection filter is used to monitor communications over the connection having a virtual IP address assigned to the local application. In some of these embodiments pausing the local application can include sending a close connection request from the local application and using the connection filter to stop the close connection request from being transmitted to the remote application. In some of these latter embodiments sending data over the connection to maintain the connection can include transmitting buffered data from the local application to the remote application until the close connection request is stopped by the connection filter. In still other embodiments in which a connection filter is established, sending data over the connection can include using the connection filter to respond to TCP ACK packets, can include using the connection filter to handle heartbeat packets, and can include receiving an unrecognizable data packet with the connection filter and sending a restore application request from the connection filter in response thereto.

In some embodiments in which the method includes restoring the local application, the method can further include reestablishing the connection between the remote and local applications. In some of these embodiments, reestablishing the connection between the remote and local applications can include adjusting the local sequence and acknowledgement numbers for each packet transmitted over the connection. Also, in some of these embodiments restoring the local application can include adjusting a checksum for each packet transmitted over the connection, and can also include adjusting a port number for each packet transmitted over the connection.

The invention also provides for a connection filter for a computing node of a computing center. The connection filter includes a connection filter driver and a connection filter daemon. The connection filter driver is configured to monitor a connection between a local application running on the computing node and a remote application running on a remote device, and send data over the connection to maintain the connection while the local application is paused. The connection filter daemon is configured to provide configuration information to the connection filter driver, and handle network connections to the remote application for the connection filter driver. In some embodiments, the connection filter driver monitors the connection by monitoring packet header control bits, and in some of these embodiments the packet header control bits are monitored for connect and disconnect requests. In some embodiments, the connection filter driver is further configured to create a connection structure in response to a connection request. Also in some embodiments, the connection filter includes a connection filter subroutine linked to a user-level program and configured to interface the user-level program with the connection filter driver. In some of these embodiments the user-level program is a snapshot daemon or a restore daemon.

Additionally, the invention also provides for a computing center including a server and a connection filter. The server is configured to host a local application and establish a connection between the local application and a remote application. The connection filter configured to maintain the connection to the remote application while the local application is paused. In some of these embodiments the connection filter can be further configured to restore the connection between the remote and local applications after the local application has been resumed.

DETAILED DESCRIPTION OF THE INVENTION

The present invention provides a method for maintaining a connection between a remote application and a local application while the local application is unavailable or inactive. The present invention also provides a method for migrating the connection from one computing node to another as needed to follow the local application. In order to better understand the present invention, aspects of the environment within which the invention operates will first be described.

Figure 1:
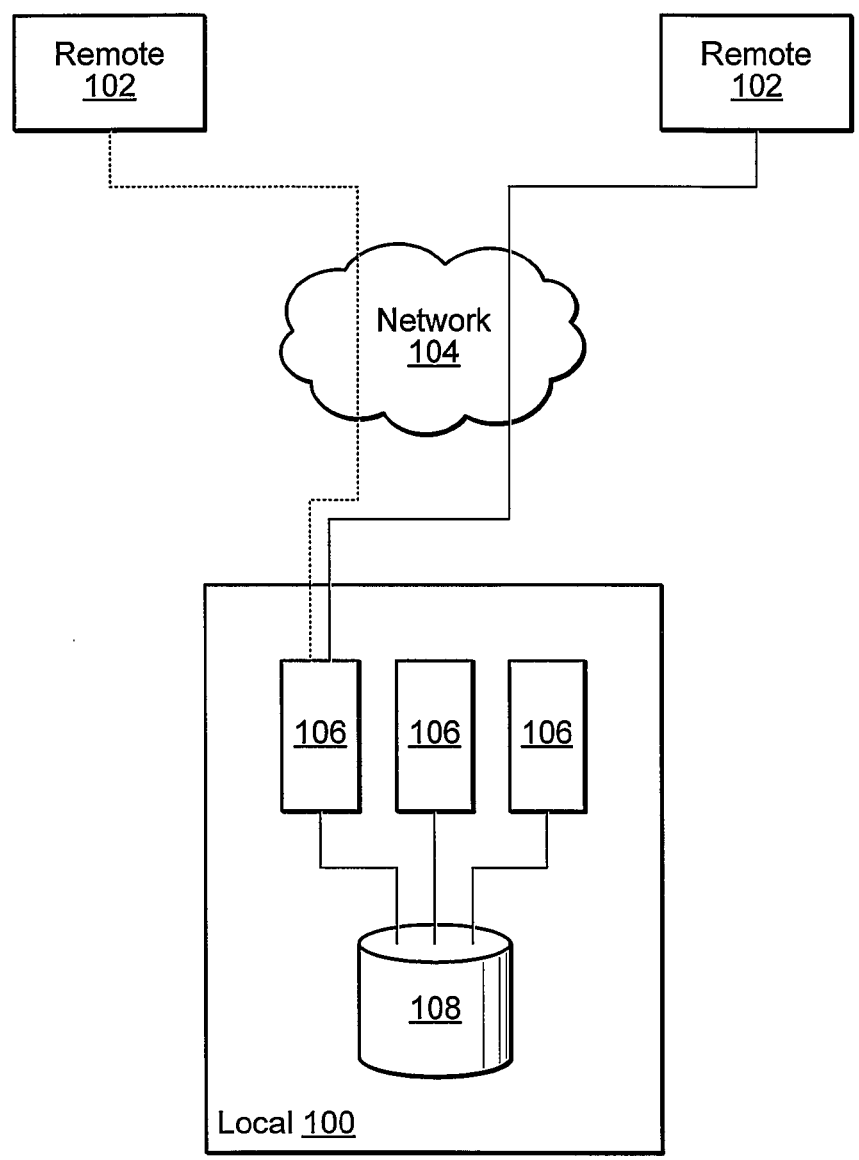
FIG. 1 is a schematic diagram of the computing environment of the present invention.

FIG. 1 is a schematic diagram of the environment within which embodiments of the present invention operates. The environment includes a local computing center 100 and one or more remote devices 102 that can be linked to the local computing center 100 across a network 104. The local computing center 100 includes one or more computing nodes 106 coupled to a storage system 108. A computing node 106 can be, for example, an application server that is configurable to simultaneously run software for one or more applications. Applications running on a computing node 106 are referred to herein as local applications. The storage system 108 is configured to be shared by the computing nodes 106 and can be, for example, a Storage Area Network (SAN) or a Network File System (NFS). The storage system 108 stores application software as well as application instances, where an application instance is a copy of a running application made at a particular point in time. The local computing center 100 can be configured as a Virtual Local Area Network (VLAN) and can also include devices such as routers, gateways, translators, resource managers, and load balancers, all not shown in FIG. 1.

A remote device 102 can be essentially any computing device such as an application server or a personal computer. Remote devices 102 are configured to run programs, herein referred to as remote applications. A remote application can be anything from a simple client program to a complex server application.

Network 104 allows connections to be established between the local computing center 100 and remote devices 102 for sharing data. The network 104 can be any kind of network or combination of networks, for example, a Local Area Network (LAN), a Wide Area Network (WAN), the Internet, etc. In some embodiments the network 104 supports connections and data transmissions according to the Internet Protocol (IP) and in some further embodiments the network 104 supports connections and data transmissions additionally according to a higher protocol such as the Transmission Control Protocol (TCP). Connections between the local computing center 100 and remote devices 102 can be either temporary or permanent, as indicated by the dashed and solid lines, respectively. Establishing, maintaining, and closing connections will be discussed in greater detail further herein.

Figure 2:
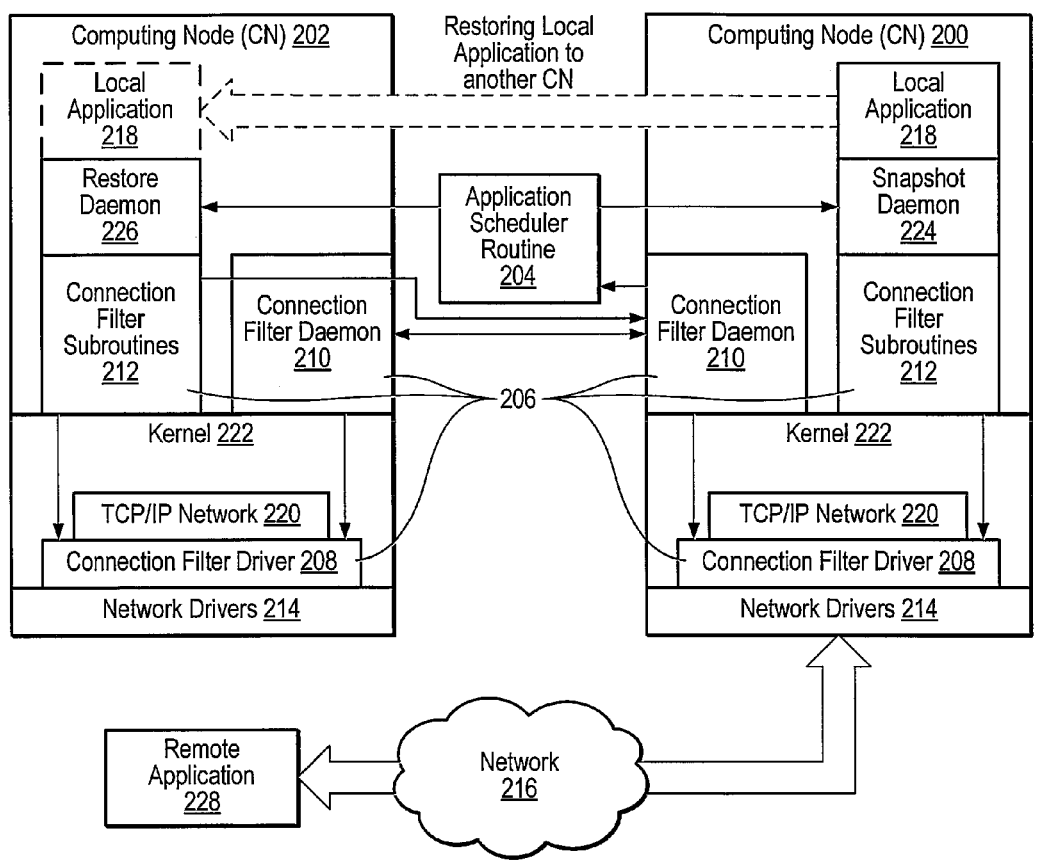
FIG. 2 is a schematic diagram of a pair of computing nodes within a local computing center according to an embodiment of the present invention.

FIG. 2 is a schematic diagram of a first computing node 200 and a second computing node 202 in communication with each other and in communication with an application scheduler routine 204. Computing nodes 200, 202 are exemplary embodiments of computing nodes 106 (FIG. 1). Also shown within the two computing nodes 200, 202 are exemplary software layers. Distributed across the software layers of both computing nodes 200, 202 is a connection filter 206 that includes a connection filter driver 208, a connection filter daemon 210, and optionally connection filter subroutines 212. The interactions of the components of the connection filter 206 will be discussed in greater detail herein below.

The lowest software layer for both computing nodes 200, 202 includes network drivers 214. The network drivers 214 send data to, and receive data from, the network 216. As more than one connection can be open to more than one local application 218, the network drivers 214 are responsible for directing data to the correct local application 218. In those embodiments in which data is segmented into TCP packets, a header associated with each packet allows the network drivers 214 to properly direct each incoming packet.

A connection filter driver 208, itself a loadable driver, sits above the network drivers 214 of both computing nodes 200, 202. The connection filter driver 208 monitors the data stream and is configured to maintain connections in certain circumstances, as will be discussed in greater detail herein. The connection filter driver 208 interacts with other programs on the local computing node 200 via ioctl calls and interacts with programs on systems other than the local computing node 102, such as those on remote devices 102, by remote connections through the connection filter daemon 210.

A kernel network stack 220 sits above the connection filter driver 208. The kernel network stack 220 includes network protocol software, for instance, TCP/IP software. The network protocol software affixes appropriate addresses to the outgoing data stream and establishes, maintains, and terminates connections according to a set of rules. These operations can include segmenting the outgoing data stream into packets and adding header information for addressing purposes, and can also include stripping header information from incoming packets and reassembling those packets into a data stream. Exemplary rules are defined in RFC 793 for TCP and RFC 791 for IP version 4 and RFC 1883 and 1884 for IP version 6.

A kernel 222 is the core of an operating system for both computing nodes 200, 202 and provides basic computing services to local applications 218 and the other programs operating on the computing nodes 200, 202 as can be seen from FIG. 2. User-level programs, such as local application 218, sit on top of the kernel 222. Another user-level program is a connection filter daemon 210. The connection filter daemon 210 provides configuration information to the connection filter driver 208. The connection filter daemon 210 also directs restore requests from the connection filter driver 208 to the application scheduler routine 204, as will be discussed further elsewhere herein. Further, the connection filter daemon 210 handles network connections to remote systems for the connection filter driver 208. Other user-level programs include connection filter subroutines 212 that are linked with certain other user-level programs such as a snapshot daemon 224 and a restore daemon 226.

In normal operation, a local application 218 running on a computing node 200 can connect through a network 216 to one or more remote applications 228 running on one or more remote devices 102 (FIG. 1). In some instances, for example, in order to fulfill a request from one remote application 228, the local application 218 must communicate with one or more other remote applications 228. In the normal course of operations it may be desirable to close the local application 218 temporarily. For instance, the application scheduler routine 204 may determine that computing node 200 is being too heavily utilized while another computing node 202 is being underutilized, and therefore may seek to shift some of the load from the first computing node 200 to the second computing node 202. In such a scenario it would be desirable to move the local application 218 from the first computing node 200 to the second computing node 202 without interrupting the connections between the local application 218 and any remote applications 228. Similarly, in other instances the remote application 228 may become inactive making it desirable, for the sake of overall system efficiency, to close the local application 218 until such time as the remote application 228 requires it again. It will be appreciated, however, that although these examples will be used for illustrative purposes, the present invention is not limited by these examples.

Returning to FIG. 2, initially a connection filter driver 208 is loaded onto each computing node 200, 202. Loading the connection filter drivers 208 is typically performed when the computing nodes 200, 202 are booted, but loading and unloading of the connection filter drivers 208 may be performed at any time. After the connection filter driver 208 has been loaded onto a computing node 200 or 202, a connection filter daemon 210 can be loaded. Once loaded, the connection filter daemon 210 reads configuration files to gather configuration information for the connection filter driver 208. The connection filter daemon 210 formats the configuration information and sends it to connection filter driver 208 using an ioctl call. The connection filter driver 208 stores the configuration information, and in some embodiments sends an acknowledgement of the configuration to the connection filter daemon 210.

As noted, the connection filter daemon 210 reads configuration files. One type of configuration file is a mounted directory that is shared by multiple computing nodes 200, 202. Another type of configuration file is local to each individual computing node 200 or 202. Yet another type of configuration file is specific to each active local application 218. Configuration files can include information such as the port number of the port used by the connection filter daemon 210; the address and port number of the application scheduler routine 204; acknowledgement and heartbeat information; the numbers of included and excluded ports; included and excluded addresses, and the numbers of each; and the name of the net interface to use.

Once the connection filter driver 208 and the connection filter daemon 210 are loaded, a local application 218 can be loaded. In those embodiments in which the local computing center 100 (FIG. 1) is configured as a VLAN, the local application 218 is assigned a virtual IP address. The connection filter driver 208 is provided with the IP address of the local application 218 so that the connection filter driver 208 can monitor the data flow to and from the local application 218. The connection filter driver 208 can monitor both for connect and disconnect requests as well as for the amount of data being sent and received by the local application 218.

Normally, the connection filter driver 208 does nothing to the network traffic except to monitor, and in some embodiments any traffic that is not in the form of TCP packets is ignored by the connection filter driver 208. In some embodiments, if a computing node 200, 202 does not have any active local applications 218, then the connection filter driver 208 on that computing node 200, 202 ignores all network traffic including any TCP packet traffic. If a local application 218 is active on a computing node 200, the connection filter driver 208 verifies that the traffic is either going to or coming from the local application 218.

Figure 3:
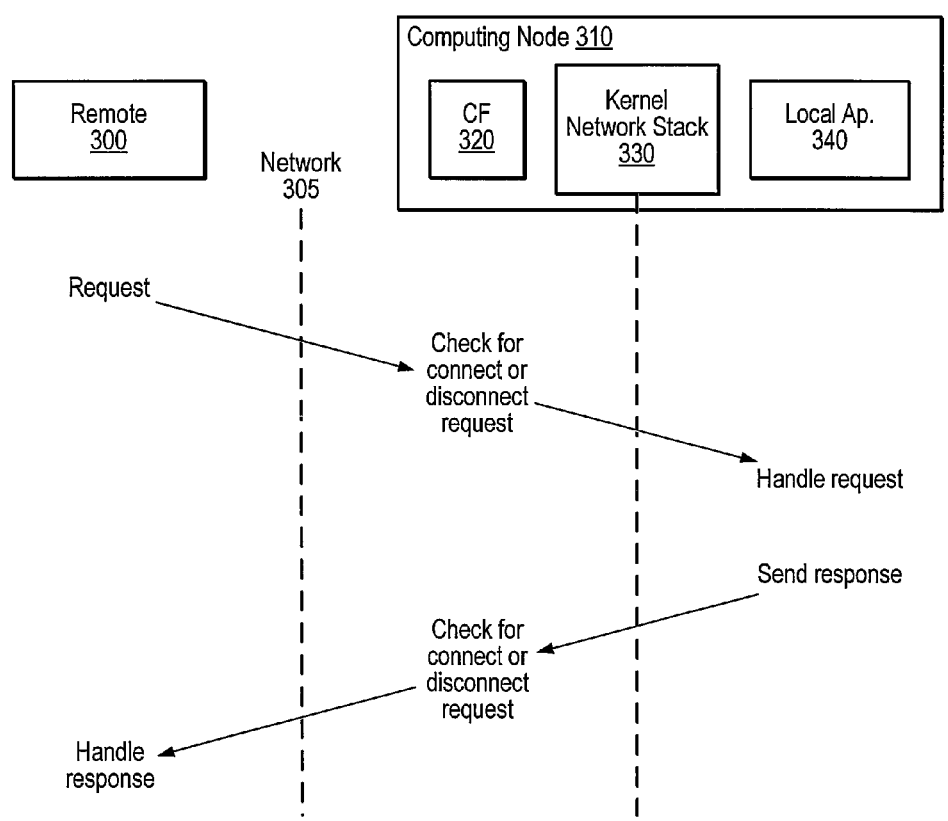
FIG. 3 illustrates the operation of a connection filter driver during the normal exchange of data according to an embodiment of the present invention.

The operation of a connection filter driver 208 during the normal exchange of data is illustrated by FIG. 3. In the example shown in FIG. 3, a remote application 300 begins by sending a request across a network 305 to a computing node 310. In those embodiments that transmit data as TCP packets, a connection filter driver 320 monitors the control bits in the header of the packet corresponding to the request. More specifically, the connection filter driver 320 monitors the control bits for connect or disconnect requests. In the example of FIG. 3, since the request is neither a connect or disconnect request, the connection filter driver 320 does nothing and the request is passed through a kernel network stack 330 and to a local application 340. The local application 340 handles the request and generates a response to be sent back to the remote application 300. The response is then passed through kernel network stack 330 and the connection filter 320. The connection filter driver 320 monitors control bits in the response for connect or disconnect requests. In the example, since the response is neither a connect or disconnect request, the connection filter driver 320 does nothing and the response is transmitted across the network 305 to the remote application 300 which then handles the response. It will be appreciated from the example of FIG. 3 that the function of connection filter driver 320 is the same regardless of the direction of the data flow.

Figure 4:
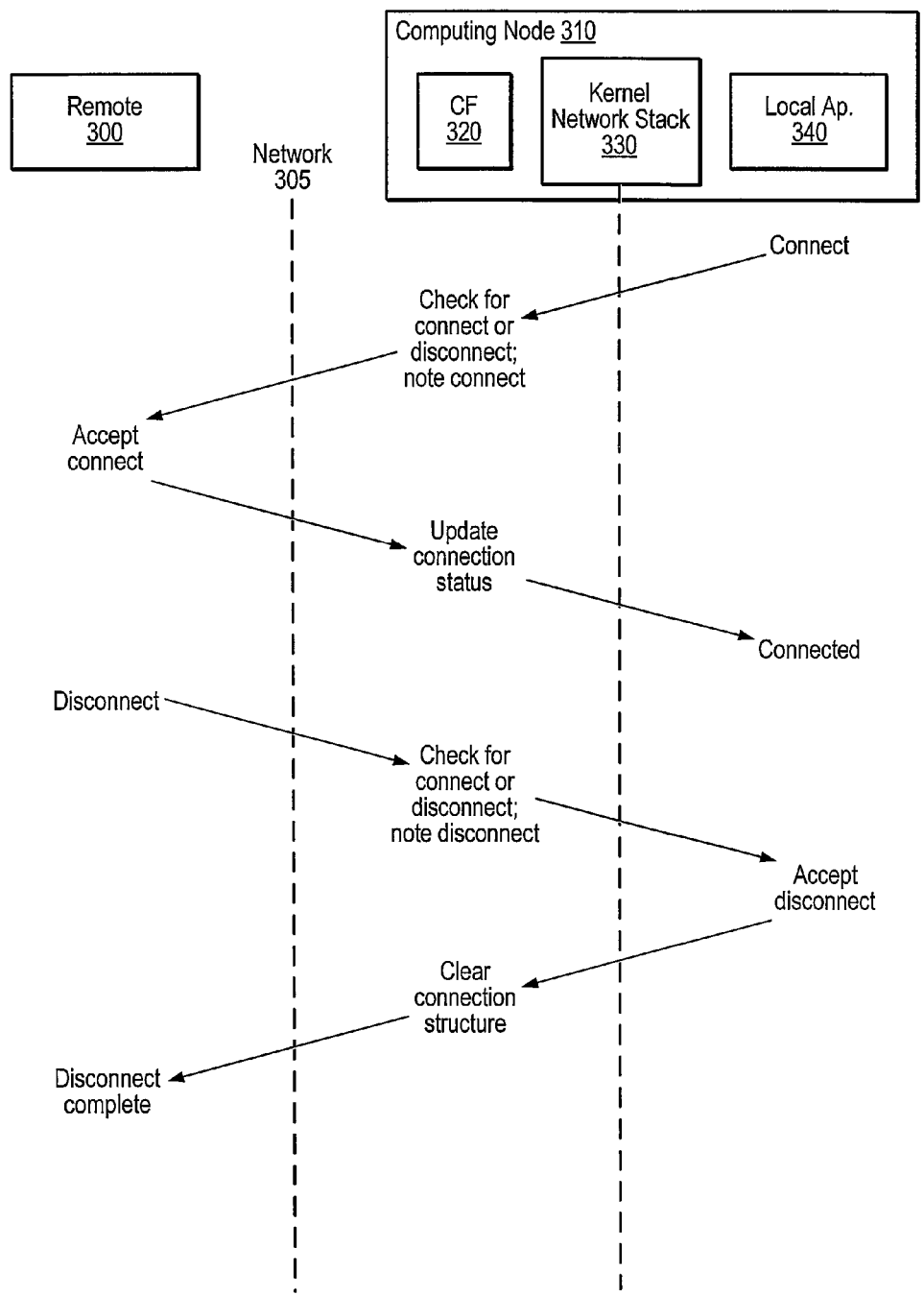
FIG. 4 illustrates the operation of a connection filter driver during connect and disconnect operations according to an embodiment of the present invention.

The functionality of the connection filter driver 320 during connect and disconnect operations is illustrated by FIG. 4. In the first example shown in FIG. 4, the local application 340 sends a connect request to the remote application 300. The connection filter driver 320 monitors the connect request and notes that it is for a connect and creates a connection structure. The connection structure is linked by the connection filter driver 320 to the local application 340 and identifies the connection with the IP address for the computing node 310 and the remote device 102 (FIG. 1) and the port numbers for the local application 340 and the remote application 300.

Once the remote application 300 receives the connect request and accepts the connection, the remote application 300 acknowledges the connection. The connection filter driver 320 monitors the connection acknowledgement and updates the connection status in the connection structure. Lastly, the local application 340 receives the connection acknowledgement. A similar process occurs when a connection is terminated, as can be seen by the second example of FIG. 4. Here, however, the connection structure is not removed until the disconnect request has been accepted and an acknowledgement of the disconnect is noted. It will be appreciated that in FIG. 4, although the connect request is initiated by the local application 340 and the disconnect request is initiated by the remote application 300, the described functionality is equally applicable where the local application 340 initiates a disconnect or the remote application 300 initiates a connect.

Referring back to FIG. 2, the connection filter 206 is able to maintain a connection while a local application 218 is paused. In some embodiments pausing the local application 218 includes acquiring a snapshot of the local application 218 and storing the snapshot to a storage system 108 (FIG. 1). In this context a snapshot is a representation of the local application 218 at a particular point in time. Restoring a snapshot of the local application 218 allows the local application 218 to resume operation from where it left off prior to pausing.

Figure 5:
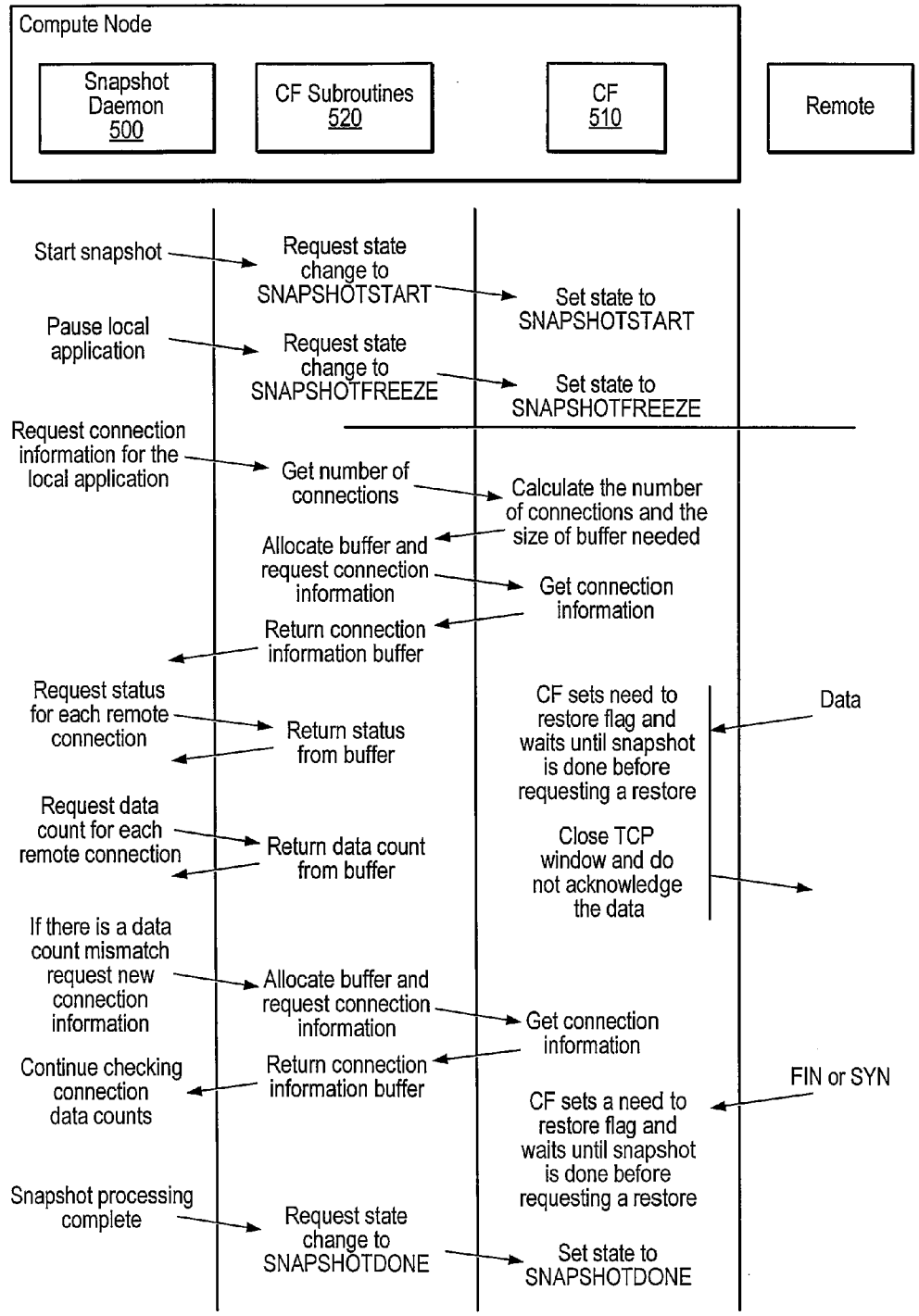
FIG. 5 illustrates the operation of a connection filter driver during a snapshot operation according to an embodiment of the present invention.

Exemplary functionality of the connection filter driver 320 during a snapshot operation is illustrated by FIG. 5. When a snapshot is initiated for a local application (not shown), for example by the application scheduler routine 204 (FIG. 2), a snapshot daemon 500 sends a notification to the connection filter driver 510, by way of connection filter subroutines 520, to change the state of the local application as represented by an application structure. In the given example, the snapshot daemon 500 sends a SNAPSHOTSTART notification to the connection filter driver 510, and the connection filter driver 510 changes the state of the local application from CONNECTED to SNAPSHOTSTART in the application structure. Although the state of the local application is changed, the states of any connections in the connection structure remain set to CONNECT. In some embodiments, the connection filter subroutines 520 use an ioctl request to change the application state of the local application in the application structure of the connection filter driver 510.

Next, the snapshot daemon 500 pauses the local application and sends another notification to the connection filter driver 510, again by way of connection filter subroutines 520, to again change the states of the connections. In the example of FIG. 5, the state of the local application in the application structure held by the connection filter driver 510 is changed from SNAPSHOTSTART to SNAPSHOT-FREEZE. At this point in time all network traffic to the local application is blocked, except for packets containing only TCP acknowledgements in some embodiments, and the connection filter driver 510 begins to maintain the connections to the remote applications.

As shown in FIG. 5, after the snapshot daemon 500 pauses the local application, the snapshot daemon 500 sends a request for connection information to the connection filter subroutines 520. The connection filter subroutines 520 gets the number of connections and sends that number to the connection filter driver 510. The connection filter driver 510 calculates the number of connections and then determines the necessary size for a connection information buffer. The connection filter driver 510 then returns this information to the connection filter subroutines 520, which allocates the connection information buffer and requests connection information from the connection filter driver 510. The connection filter driver 510 gets the connection information and returns it to the connection filter subroutines 520. The connection filter subroutines 520 then returns the connection information buffer to the snapshot daemon 500.

Also after the local application has been paused, the snapshot daemon 500 validates that the connections to the remote applications are being handled by the connection filter driver 510 and that all of the data has been accounted. In some embodiments, the snapshot daemon 500 makes a separate call to the connection filter subroutines 520 for each connection to a remote application to obtain the connection's status information and data count. The connection filter subroutines 520 retain the status and data count for each connection in the connection information buffer. In some embodiments, if the data count does not match an expected data count, the snapshot daemon 500 can make another request for connection information. The subsequent request follows the same sequence as the original request, as can be seen from FIG. 5.

Once the state of the local application in the application structure has been set to SNAPSHOTFREEZE and all network traffic to the local application has been blocked, the connection filter driver 510 handles the connections to the remote applications. It is important to note that although network traffic to the local application is blocked, the connection filter driver 510 can still allow data to be sent from the local application to allow the data buffers to finish emptying. In those embodiments that use TCP packets, the connection filter driver 510 will recognize a FIN segment as the end of the data stream. In these embodiments the connection filter driver 510 blocks the FIN, and any subsequent packets, from being sent to the remote application. Otherwise, the remote application will receive the FIN and interpret it to mean that the connection is being closed. Instead of passing the FIN to the remote application, the connection filter driver 510 instead returns a FIN and an acknowledgement to the local application.

Near the end of the snapshot process the local application is terminated. Each connection is split into a local side and a remote side on either side of the connection filter driver 510. The connection filter driver 510 closes the local side connection while maintaining the remote side connection. The connection state of each connection in the connection structure is set to CONNECTRMT.

Once the snapshot processing is complete, the snapshot daemon 500 sends a notification to the connection filter driver 510, by way of connection filter subroutines 520, to again change the state of the local application in the application structure. In the given example, the snapshot daemon 500 sends a SNAPSHOTDONE notification to the connection filter driver 510, and the connection filter driver 510 changes the state of the local application from SNAPSHOT-FREEZE to SNAPSHOTDONE in the application structure. It should be noted that the snapshot of the local application is given a snapshot ID and saved to a storage system 108 (FIG. 1).

While the connection filter driver 510 is handling the connections to the remote applications, either during the snapshot process or after the snapshot is complete, the connection filter driver 510 can receive several different types of data intended for the local application. The types of data include normal network activities such as acknowledgements and heartbeats, requests to close, open, or abort a connection, and all other data. The treatment of each of these data types by the connection filter driver 510 will be discussed below.

Generally, if data is received during a snapshot from a remote application by the connection filter driver 510, and the data is neither a connection reset nor configuration heartbeat data, then the connection filter driver 510 will not be able to mimic the local application to maintain the connection. In the situation where a snapshot of the local application is in progress, and none of the local side connections have yet been terminated, the snapshot daemon 500 can abort the snapshot process. This is achieved, in some embodiments, by sending a SNAPSHOTABORT request to the connection filter driver 510 via the connection filter subroutines 520. The connection filter driver 510 will then set the states of the local application in the application structure to RESTORED and the normal data flow will resume.

Otherwise, if a snapshot is in progress and local side connections have been terminated, as shown in FIG. 5, the connection filter driver 510 sets a restore flag so that the connection filter driver 510 will know to send a restore request once the snapshot is completed. The restore process is discussed in detail elsewhere herein. In addition to setting the restore flag, the connection filter driver 510 will not acknowledge the data, and will instead tell the remote application to stop sending data. In some embodiments, this is achieved by setting a TCP window to zero.

In those situations in which the application state in the application structure is set to SNAPSHOTDONE when the connection filter driver 510 receives data that is neither normal network activities nor requests to abort a connection nor a configured heartbeat message then the connection filter driver 510 requests a restore of the local application. The restore process will be discussed in greater detail elsewhere herein.

The connection filter driver 510 may receive requests to close, open, or abort a connection during the snapshot process. As shown in FIG. 5, in some embodiments when, during a snapshot, a FIN request (to close a connection) or a SYN request (to open a connection) is received by the connection filter driver 510, the FIN or SYN request is stopped by the connection filter driver 510 and not passed on. Instead, the connection filter driver 510 sets a restore flag so that the connection filter driver 510 will know to send a restore request once the snapshot is completed. The restore process is discussed in detail elsewhere herein.

In some embodiments when, during a snapshot, a RST request (to abort a connection) is received by the connection filter driver 510, the connection filter driver 510 will set the connection state in the connection structure to RST to indicate a reset has been received but that the connection structure cannot yet be removed from the connection filter driver until after the local application has been restored. The connection filter driver 510, however, will not respond to the RST request and does not set a restore flag. Eventually, once the local application has been restored and the connection has been reestablished, the connection filter driver 510 will send the RST request to the local application to abort the connection.

The handling of open, close, and abort requests by the connection filter driver 510 after a snapshot is completed is analogous to the handling of such requests during a snapshot, except that in the case of FIN and SYN requests there is no longer a need to set a restore flag. Instead, the connection filter driver 510 requests a restore immediately.

Additionally, the connection filter driver 510 is configured to handle acknowledgements and heartbeats during and after a snapshot process. If an acknowledgement is received by the connection filter driver 510, the connection filter driver 510 will respond to the remote application with an acknowledgement that sets the sequence and acknowledgement numbers to current values. The acknowledgement may also include any heartbeat data the connection filter driver 510 has received.

Heartbeat data can be handled in two ways. If the connection filter driver 510 receives a heartbeat message then it responds with a heartbeat response message and, in some embodiments, will leave the TCP window open. Alternately, the connection filter driver 510 can be configured to periodically send a heartbeat message. This can be achieved, for example, by configuring the connection filter driver 510 with an IP address for a remote application and a time interval to wait between heartbeat messages. This alternative approach is useful where the remote application is configured to close the connection if there is no activity. It should be noted that a periodic heartbeat can also be initiated by the connection filter driver 510 if the connection filter driver 510 closes the TCP window.

Referring again to FIG. 2, once a snapshot of a local application 218 has been acquired and saved, a connection filter driver 208 on the computing node 200 on which the local application 218 resided will keep connections to remote applications 228 open. Eventually, it will become necessary to restore the local application 218 either to the same computing node 200 or to another computing node 202. As previously noted, there are many reasons why the local application 218 may need to be restored. In some instances the snapshot and restore are caused by load balancing, in which case the local application 218 will be restored to a different computing node 202 than the one on which it previously ran. In this case, the application scheduler routine 204 initiates the restore process. In other instances the connection filter driver 208 can request that the local application 218 be restored so that the local application 218 can again handle network activity. In these instances the connection filter driver 208 notifies the connection filter daemon 210, and the connection filter daemon 210 obtains the IP address of the local application to be restored and sends a restore request to the application scheduler routine 204.

Figure 6:
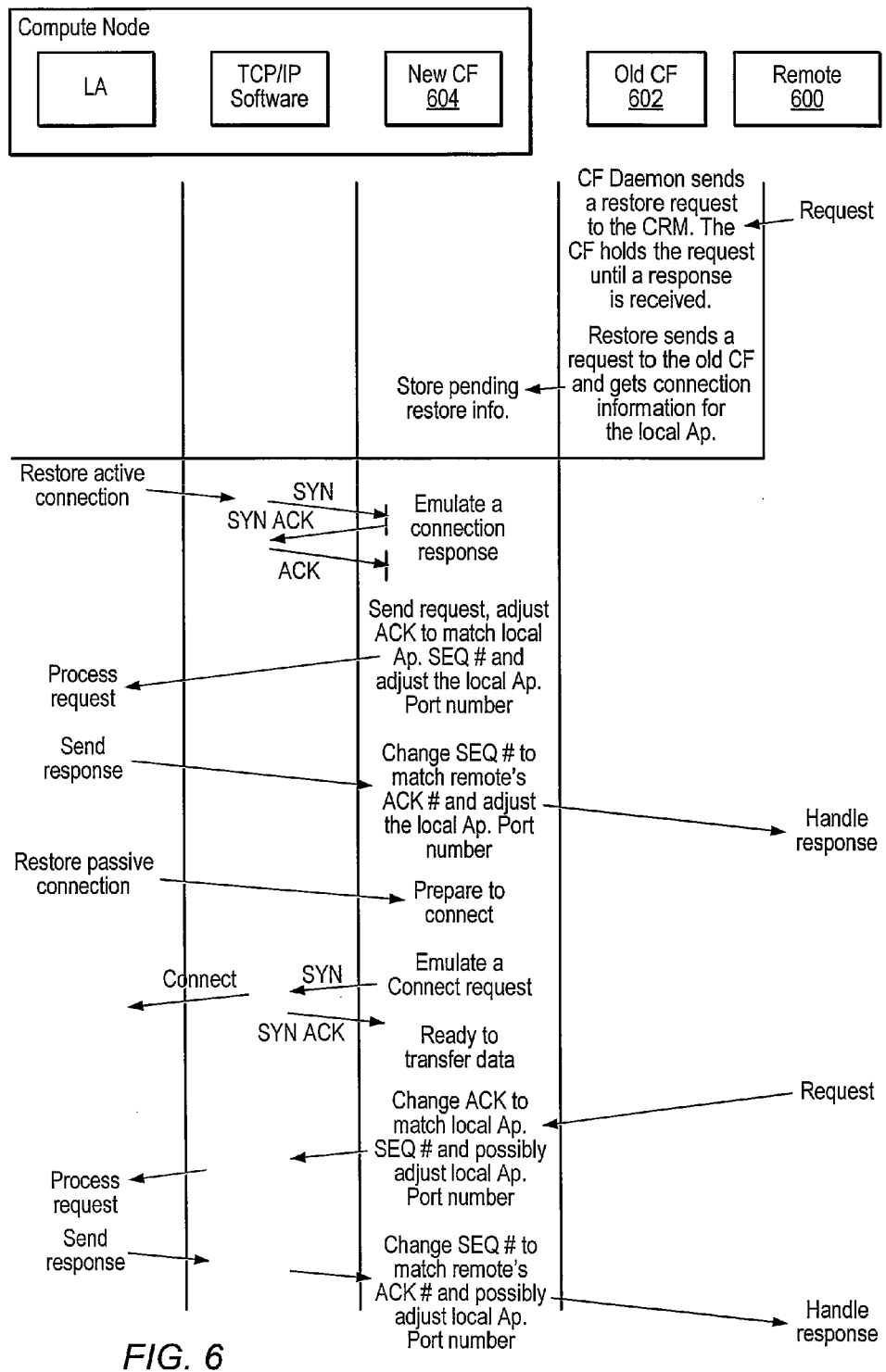
FIG. 6 illustrates the operation of a connection filter driver during a restore operation according to an embodiment of the present invention.

Exemplary functionality during a restore operation is illustrated by FIG. 6. In the example shown in FIG. 6, and with continued reference to FIG. 2, a request is initially received from a remote application 600 by the old connection filter driver 602 that has been maintaining the connection. The old connection filter driver 602 notifies the connection filter daemon 210 of the same computing node to send a restore request to the application scheduler routine 204. The connection filter driver 602 will then hold the request until a response is received. The connection filter daemon 210 gets the IP address and port number of the application scheduler routine 204 from its configuration file. In some embodiments, the connection filter daemon 210 sends a restore request to the application scheduler routine 204 as an ASCII message that is 25 bytes long and has the following form:

Restore ddd.ddd.ddd.ddd where "ddd" is a decimal number up to 3 digits long and forms the IP address of the local application that needs to be restored.

The application scheduler routine 204 then causes the restore daemon 226 to send an ioctl call to the new connection filter driver 604 via the connection filter subroutines of the new computing node. The new connection filter driver 604 is sent the IP address, the snapshot ID, and the connection structure of the local application to be restored and is instructed to set the application state of the local application in the application structure to RESTORESTART. The new connection filter driver 604 allocates space for the connection structure and initializes it. The prior connection structure is then copied into the newly initialized connection structure. In those instances in which the snapshot was performed on the same computing node as the restore is occurring, it is not necessary to initialize a new connection structure as the new connection filter driver 604 is the same as the prior one and already has the connection structure with the application state set to SNAPSHOT. In these instances the application state is simply changed to RESTORESTART. The new connection filter driver 604, in some embodiments, is able to discern whether the snapshot is from the same computing node or a different computing node by checking the computing node IP address that was stored along with the snapshot data.

In some embodiments there are two types of connections that can be restored, active (client initiated) connections and passive (server accepted) connections. For each connection to a remote application 600 the restore daemon checks the connection's status through the new connection filter driver 604 and sends either a "send SYN" request if it is a passive connection or an activate request if it is a active connection. These requests are sent via the connection filter subroutines on the same computing node. FIG. 6 shows exemplary processes for restoring both an active connection and restoring a passive connection.

For each prior active connection the restore daemon initiates a connection and the new connection filter driver 604 acknowledges the connection. A handshake sequence, as shown in FIG. 6, is then used to provide the new connection filter driver 604 with a new port number, if different. The restore daemon sends a message to the new connection filter driver 604 via the connection filter subroutines that a specific connection is about to be restored, and the new connection filter driver 604 marks this connection. The new connection will use a different local socket. When the SYN request is received, the new connection filter driver 604 only checks the IP addresses and the remote port number, but does not check the local port number. Instead, the new connection filter driver 604 sets the local port number as an adjusted port number. The new connection filter driver 604 also synchronizes the remote sequence number. In all further transfers the port number is translated just as the sequence number.

If, however, the connection being restored is a passive connection, the restore daemon makes a request of the new connection filter driver 604 via the connection filter subroutines to send a SYN request to the local application. The new connection filter driver 604 ensures that the ports and the remote sequence numbers match the open connection; the local sequence number still has to be translated. The new connection filter driver 604 synchronizes the port and remote sequence numbers and sends a SYN to a listen port. In this case the port numbers remain the same.

In either instance, whether the connection is active or passive, the "restore connection request" is used by the connection filter subroutines to convey the connection information to the new connection filter driver 604. The same TCP connection options given in the original connection request are used during the emulated connection. If a connection request is received and there is no connection structure associated with the connection, the request is treated as a new connection and passed on to the remote server. If there is a structure associated with it, the new connection filter driver 604 handles the restoration of the connection. If the new connection filter driver 604 restores the connection, the new connection filter driver 604 needs to adjust the sequence number for each packet to or from the local application for as long as the connection is open. Further, in the case of an active connection; the port number also needs to be adjusted. The adjusting of sequence numbers is dependent on the connection and is stored in each connection structure. It should be noted that sequence numbers do not need to be adjusted for new connections to the local application, only for those connections that have persisted through snapshot and restore processes.

Next, each restored connection is activated by setting the application state in the application structure to RESTORED. This is achieved by the restore daemon sending a RESTORED request with the IP address of the local application to the new connection filter driver 604 via the connection filter subroutines. Thereafter, the new connection filter driver 604 sends an acknowledgement along with an open TCP window for each connection for that the TCP window was previously closed by the prior connection filter driver 602. Opening the TCP window enables the remote application 600 to resume sending data. The data flow is now restored to the local application with sequence numbers being adjusted by the new connection filter driver 604 where necessary.

When the old connection filter driver 602 sends the connection structure for the local application to the new connection filter driver 604, the old connection filter driver 602 sets the state of the application in the application structure that it retains to BLOCKDATA. The old connection filter driver 602 then stops responding to the connections it had been maintaining. Therefore, it is important that the new connection filter driver 604 begin handling these connections as fast as possible and before any network timeouts can occur. Normally, this occurs on the order of seconds. Lastly, a request is sent to the old connection filter driver 602, if different from the new connection filter driver 604, to release the connection structure.

As with the snapshot process, the restore process also provides for an abort feature. The restore process can be aborted any time prior to when the application state is set to RESTORED. If an abort occurs during a restore process in which the local application is being restored to a different computing node than it resided on when the snapshot was acquired, then the local application and connection structures are dropped. The old connection filter driver 602 is informed that the restore has been aborted and therefore will set the application state back to SNAPSHOTDONE.

Figure 7:
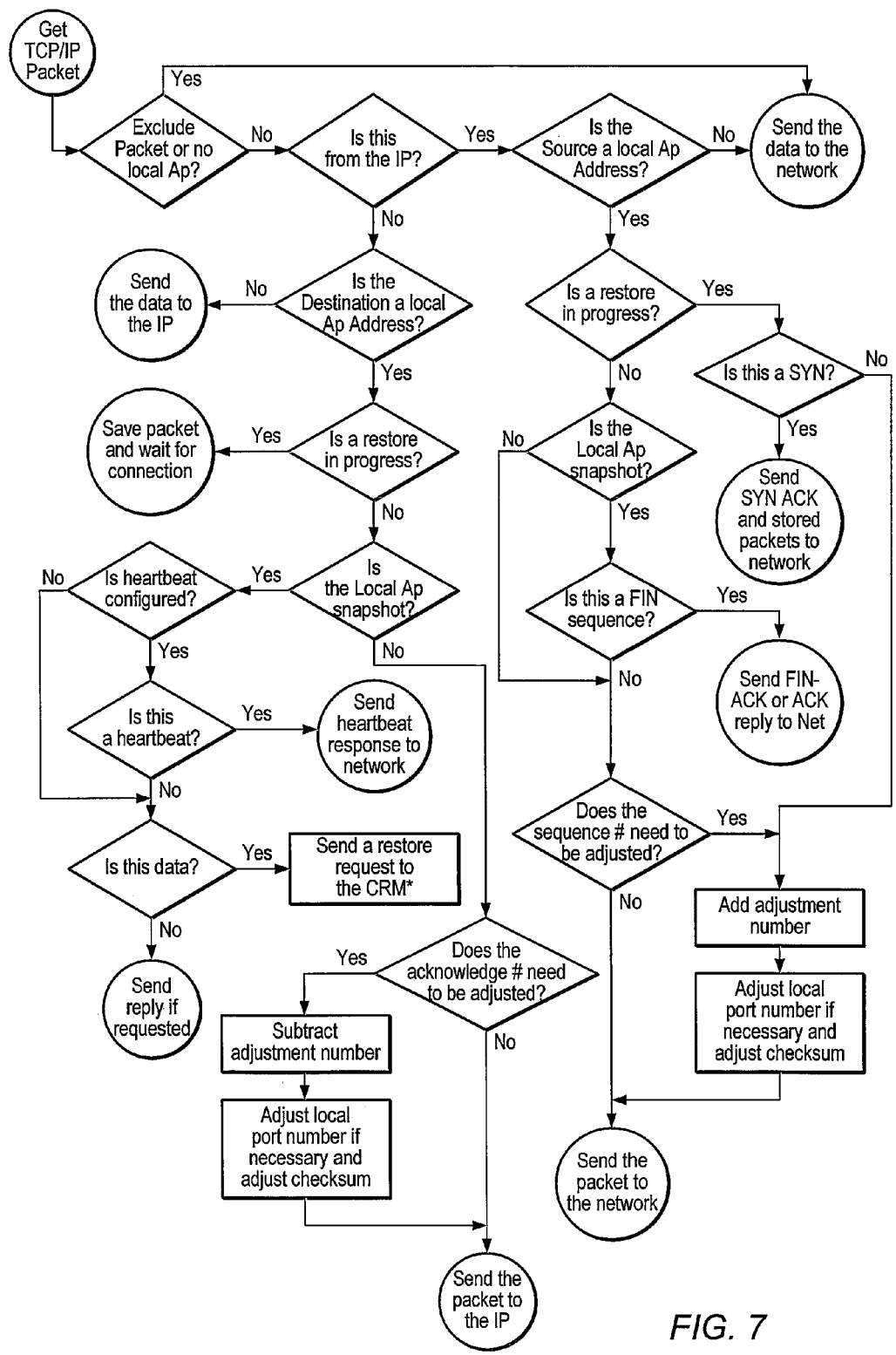
FIG. 7 is a flowchart representation for the processing of network data according to an embodiment of the present invention.

FIG. 7 is a flowchart representation for the processing of network data according to an embodiment of the present invention. In FIG. 7 circles indicate beginnings and endings of processes, diamonds indicate decisions, and rectangles are process blocks. Initially, processing network data involves checking for new connections. With a snapshot, the connection filter driver needs to intercept FIN packets from the local application and intercept the packets from the remote application. With a restore, the connection filter driver has to intercept SYN packets and handle initiating connections. After a restore the connection filter driver needs to adjust the sequence and acknowledgement numbers and possibly the port number as previously described. When a restore request is sent to the application scheduler routine, the data packet is dropped; the TCP window is shut and an acknowledgement packet is sent that does not acknowledge the latest data. This operation is shown with a rectangular box in FIG. 7. The "Exclude" decision diamond near the start of the flowchart has two "Y." This indicates that the packet can be directed to either the IP Stack or to the network driver. This is used to show that in the exclude case the data is just passed through.

Figure 8:
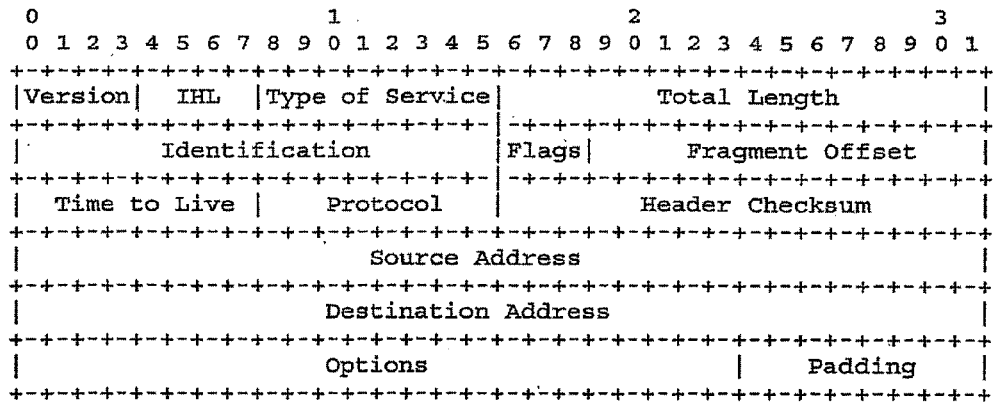
FIG. 8 is a schematic representation of the Internet Protocol (IP) header format for version 4.
Figure 9:
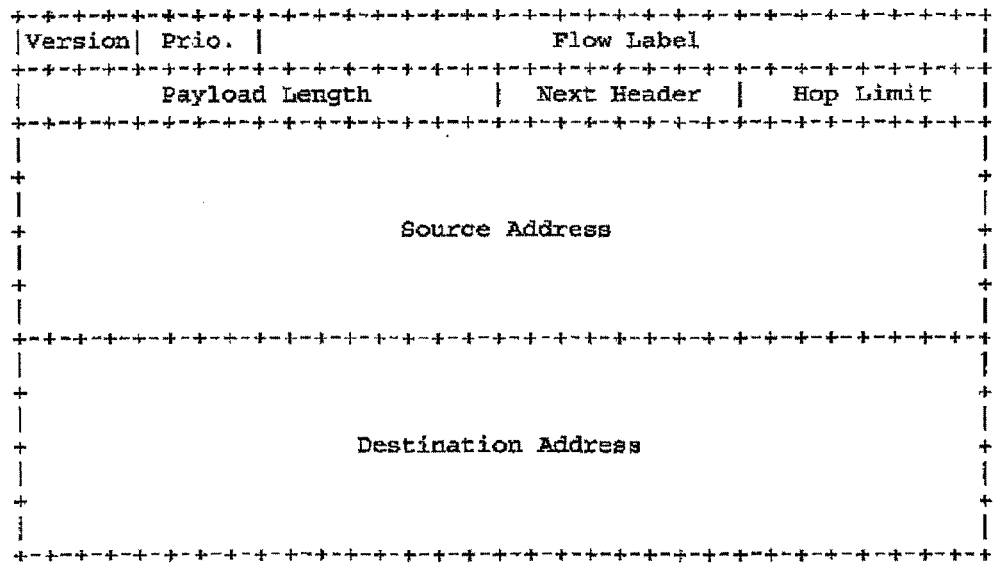
FIG. 9 is a schematic representation of the Internet Protocol (IP) header format for version 6.
Figure 10:
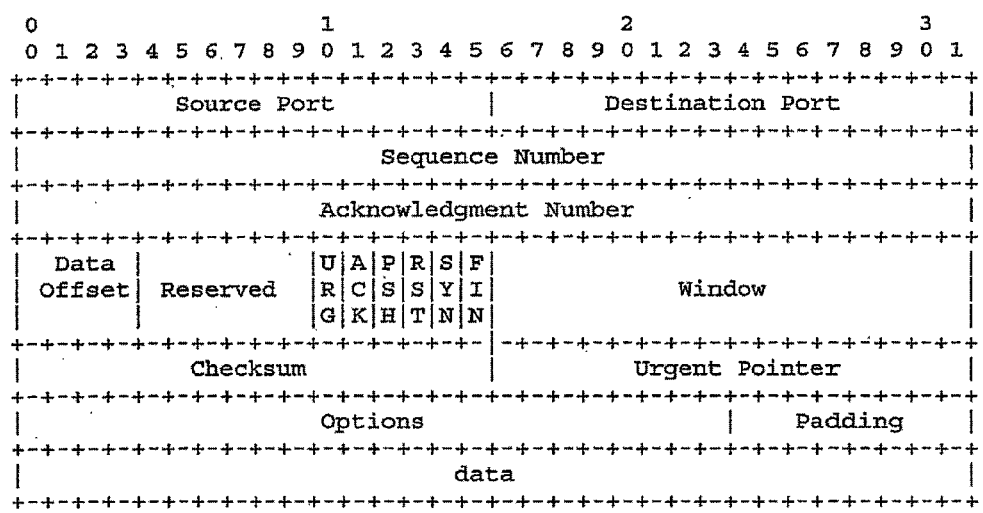
FIG. 10 is a schematic representation of a TCP header that the connection filter driver duplicates according to an embodiment of the present invention.

FIGS. 8 and 9 are schematic representations of the Internet Protocol (IP) header formats for versions 4 and 6, respectively, and are provided herein as a reference as the connection filter driver must mimic the connection protocol, which in some embodiments may be either version 4 or version 6. Similarly, FIG. 10 is a schematic representation of a TCP header that the connection filter driver duplicates in some embodiments. In FIGS. 8-10 the fields that are of importance to the connection filter driver include: version; protocol (which is Next Header field in the IPv6 header); IHL (number of 32 bit words in the internet header); source address; destination address; source port; destination port; header checksum; sequence number; acknowledgement number; data offset; control bits in the TCP header (ACK, RST, SYN, FIN); checksum; window. Another field that is of importance to the connection filter driver is the option filed which must be included in the connection packets.

Figure 11:
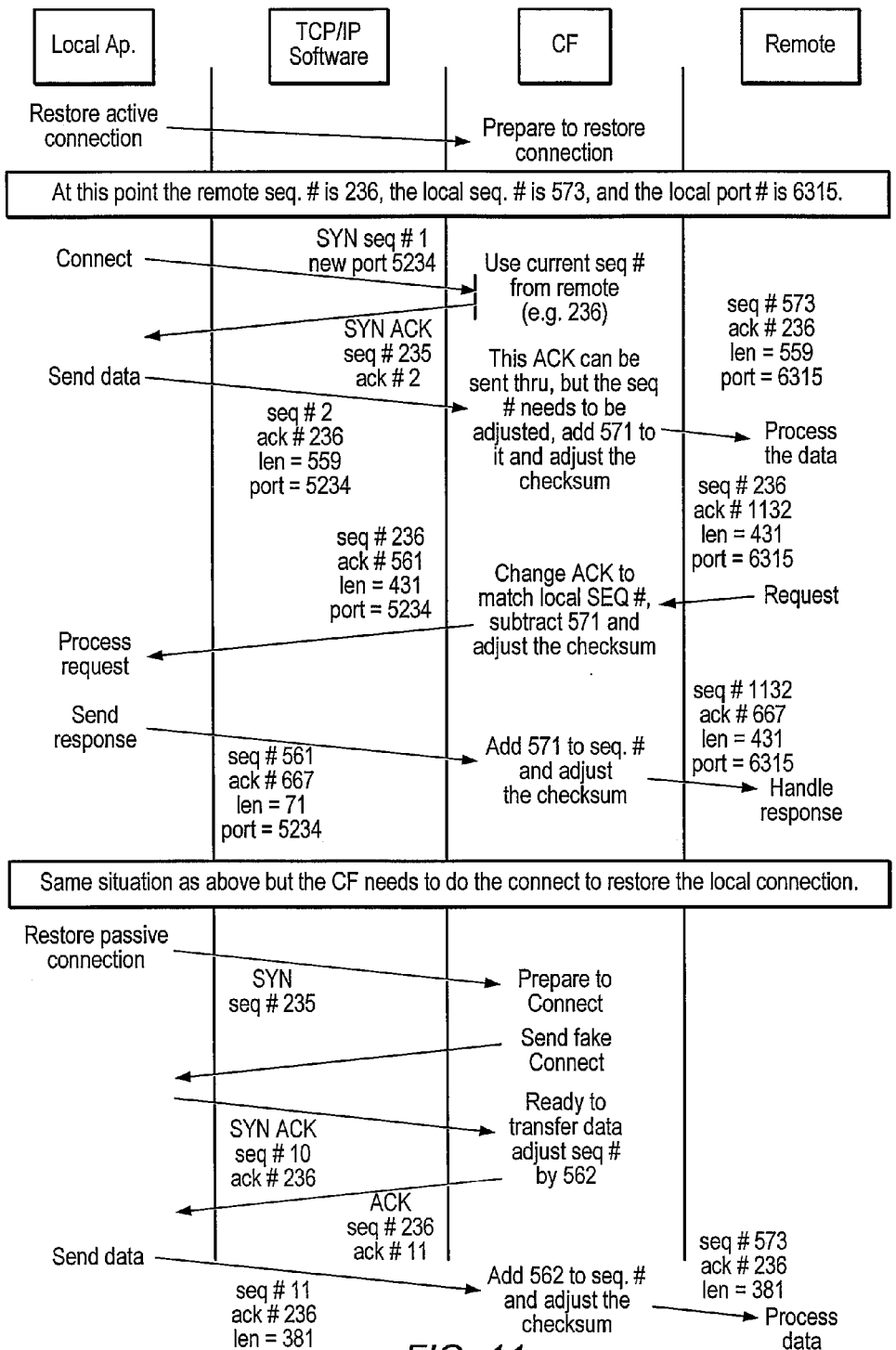
FIG. 11 illustrates how values in TCP headers are adjusted for both active and passive connections according to an embodiment of the present invention.

The connection filter driver monitors the control bits in the TCP header to tell if it is a SYN or FIN. When a snapshot is performed, the connection filter driver blocks the FIN packet from the local TCP/IP program for connections to the local application and constructs a FIN-ACK packet which is returned to the local application. Also, there may be a one last ACK packet that the connection filter driver must block. When a restore is performed, the connection filter driver needs to either generate a SYN packet if the local application is acting as a server, or return a SYN-ACK packet in response to a SYN if the local application is acting as a client. The connection filter driver also notes the sequence number and compares it to what the remote application is expecting. Based on this the connection filter driver adjusts the sequence and acknowledgement numbers for each packet transferred on the connection. The connection filter driver needs to adjust the checksum value according to the changed header value. The checksum can be calculated on the fly. FIG. 11 illustrates how values in the header are adjusted for both active and passive connections, respectively.

It can be seen from FIG. 11 that the connection structure of each data packet is checked to handle the necessary adjustments to the sequence, acknowledgement, and port numbers. The connection structure and the direction that the packet is being sent determines whether the sequence or acknowledgement numbers need to be adjusted. The connection structure also indicates whether the local application port number needs to be adjusted.

The connection filter driver is able to differentiate between data is being received from the network stack or a remote application through the network drivers. For a packet received from the remote application the connection filter driver matches a destination address and port number to the IP address and port number of the local application in the connection structure. The connection filter driver also matches the source address and port number with the IP address and port number of the remote application. The connection filter driver then processes the packet. For data received from the network stack, the connection filter driver matches the source address and port number to the IP address and port number of the local application in the connection structure. The connection filter driver also matches the destination address and port number with the IP address and port number for the remote application. The connection filter driver then processes the packet.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method for maintaining a connection between a remote application and a local application, comprising:
    establishing the connection between the remote and local applications, wherein the local application is executing on a first computing node and the remote application is executing on a remote computing node;
    establishing a connection filter along the connection between the local and remote applications;
    pausing the local application, wherein the pausing comprises using the connection filter to sustain the connection with the remote application during the pausing, wherein pausing the local application includes sending a close connection request from the local application and using the connection filter to stop the close connection request from being transmitted to the remote application; and
    restoring the local application on the first computing node, wherein the restoring includes emulating the connection for the local application to reconnect the local application, and wherein emulating the connection and sustaining the connection with the connection filter cease in response to completing the restoring.

2. The method of claim 1 wherein the connection is a TCP connection.

3. The method of claim 1 wherein establishing the connection includes assigning a virtual IP address to the local application.

4. The method of claim 3 wherein establishing the connection includes monitoring communications having the virtual IP address.

5. The method of claim 1 wherein pausing the local application includes determining an activity level for the connection.

6. The method of claim 1 wherein pausing the local application includes capturing a snapshot of the local application.

7. The method of claim 6 wherein capturing the snapshot includes freezing a state of the local application.

8. The method of claim 7 wherein capturing the snapshot includes storing the state to a memory device.

9. The method of claim 1 wherein using the connection filter to sustain the connection includes transmitting buffered data from the local application to the remote application.

10. The method of claim 1 wherein using the connection filter to sustain the connection includes responding to TCP ACK packets.

11. The method of claim 1 wherein using the connection filter to sustain the connection includes handling heartbeat packets.

12. The method of claim 1 wherein pausing the local application includes storing a state of the local application to a memory device and restoring the local application includes recalling the state from the memory device.

13. The method of claim 1 wherein using the connection filter to sustain the connection includes receiving an unrecognizable data packet with the connection filter and sending a restore application request from the connection filter in response thereto.

14. The method of claim 1 wherein further comprising adjusting the local sequence and acknowledgement numbers for each packet transmitted over the connection subsequent to the restoring.

15. The method of claim 14 wherein further comprising adjusting a checksum for each packet transmitted over the connection subsequent to the restoring.

16. The method of claim 14 wherein further comprising adjusting a port number for each packet transmitted over the connection subsequent to the restoring.

17. A storage medium comprising program instructions which are computer-executable to implement a connection filter for a computing node of a computing center, comprising:

a connection filter driver configured to monitor a connection between a local application running on the computing node and a remote application running on a remote device, and wherein the connection filter driver is configured to sustain the connection with the remote application during a pause of the local application, wherein the connection filter driver is configured to stop a close connection request issued by the local application in response to a pause from being transmitted to the remote application, and wherein the local application is restored on the computing node subsequent to the pause, and wherein the connection filter driver is further configured to emulate the connection for the local application to reconnect the local application during the restore, and wherein the connection filter driver is configured to cease emulating the connection and sustaining the connection in response to completing the restore; and a connection filter daemon configured to provide configuration information to the connection filter driver, and handle network connections to the remote application for the connection filter driver.

18. The storage medium of claim 17 wherein the connection filter driver monitors the connection by monitoring packet header control bits.

19. The storage medium of claim 18 wherein the packet header control bits are monitored for connect and disconnect requests.

20. The storage medium of claim 17 wherein the connection filter driver is further configured to create a connection structure in response to a connection request.

21. The storage medium of claim 17 further comprising a connection filter subroutine linked to a user-level program and configured to interface the user-level program with the connection filter driver.

22. The storage medium of claim 21 wherein the user-level program is a snapshot daemon.

23. The storage medium of claim 21 wherein the user-level program is a restore daemon.

24. The storage medium of claim 17 wherein establishing the connection includes assigning a virtual IP address to the local application, and wherein the connection filter is configured to monitor communications over the connection having the virtual IP address.

25. The storage medium of claim 17 wherein the connection filter is configured to transmit buffered data from the local application to the remote application until the close connection request is stopped by the connection filter.

26. The storage medium of claim 17 the connection filter is configured to sustain the connection by responding to TCP ACK packets.

27. The storage medium of claim 17 the connection filter is configured to sustain the connection by handling heartbeat packets.

28. The storage medium of claim 17 the connection filter is configured to sustain the connection by receiving an unrecognizable data packet and sending a restore application request in response thereto.

29. A computing center, comprising:

a server configured to host a local application, and establish a connection between the local application and a remote application executing on a remote device; and a connection filter executable on the server and configured to maintain the connection to the remote application while the local application is paused, wherein the connection filter is configured to sustain the connection with the remote application during the pause of the local application, wherein the connection filter is configured to stop a close connection request issued by the local application in response to a pause from being transmitted to the remote application and wherein the server is configured to restore the local application on the computing node subsequent to the pause, and wherein the connection filter is further configured to emulate the connection for the local application to reconnect the local application during the restore, and wherein the connection filter is configured to cease emulating the connection and sustaining the connection in response to completing the restore.

* * * * *